(12) United States Patent
Chun et al.

(10) Patent No.: US 8,309,630 B2
(45) Date of Patent: Nov. 13, 2012

(54) POLYMER-ENCAPSULATED PIGMENT

(75) Inventors: Doris Pik-Yiu Chun, Sunnyvale, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/693,304

(22) Filed: Jan. 25, 2010

(65) Prior Publication Data

US 2011/0184111 A1    Jul. 28, 2011

(51) Int. Cl.
*C08K 9/00*    (2006.01)

(52) U.S. Cl. ........ 523/200; 523/201; 523/204; 523/160; 523/161; 106/400

(58) Field of Classification Search ............ 523/160, 523/161, 200; 347/100; 106/400
See application file for complete search history.

(56) References Cited

U.S. PATENT DOCUMENTS

| | | | |
|---|---|---|---|
| 3,798,045 A | 3/1974 | Jackson | |
| 4,808,230 A | 2/1989 | Bugnon et al. | |
| 4,880,472 A | 11/1989 | Bugnon et al. | |
| 5,026,429 A | 6/1991 | Mroaga et al. | |
| 5,200,436 A | 4/1993 | Kumar et al. | |
| 5,274,010 A | 12/1993 | Bugnon et al. | |
| 5,482,547 A | 1/1996 | Bugnon et al. | |
| 5,641,350 A | 6/1997 | Chassot et al. | |
| 6,458,968 B2 | 10/2002 | Benicewicz et al. | |
| 6,462,125 B1 | 10/2002 | White et al. | |
| 6,762,259 B2 | 7/2004 | Nobori et al. | |
| 6,767,638 B2 | 7/2004 | Samaranayake | |
| 6,972,303 B1 * | 12/2005 | Miyabayashi et al. | ........ 523/160 |
| 7,172,812 B2 | 2/2007 | Greiwe et al. | |
| 7,250,479 B2 | 7/2007 | Le et al. | |
| 7,354,972 B2 | 4/2008 | Ganapathiappan | |
| 7,387,830 B2 | 6/2008 | Maul et al. | |
| 7,449,217 B2 | 11/2008 | Wickramanayake et al. | |
| 7,470,762 B2 | 12/2008 | Percee et al. | |
| 7,557,235 B2 | 7/2009 | Lai et al. | |
| 7,563,842 B2 | 7/2009 | Ma et al. | |
| 7,579,080 B2 | 8/2009 | Vasudevan | |
| 2002/0056403 A1 | 5/2002 | Johnson et al. | |
| 2005/0090581 A1 | 4/2005 | Oyanagi | |
| 2007/0078200 A1 | 4/2007 | Yoshida et al. | |
| 2007/0107635 A1 | 5/2007 | Soane et al. | |
| 2007/0117882 A1 | 5/2007 | Aoyama | |
| 2007/0134179 A1 | 6/2007 | Ino et al. | |
| 2008/0250971 A1 * | 10/2008 | Ganapathiappan | ........ 106/31.85 |
| 2009/0169892 A1 * | 7/2009 | Bazzi et al. | ........ 428/404 |

FOREIGN PATENT DOCUMENTS

| | | |
|---|---|---|
| JP | 61266376 A | 11/1986 |
| JP | 04309566 A | 11/1992 |
| JP | 2001011342 A | 1/2001 |
| JP | 2007138053 A | 6/2007 |

OTHER PUBLICATIONS

Chunzhao Li et al., Synthesis of well-defined polymer brushes grafted onto silica nanoparticles via surface reversible addition-fragmentation chain transfer polymerization, Macromolecules (2005) vol. 38(14), 5929-5936, published Jun. 15, 2005.*
Wei Gu, Surface modification of pigments and its role in offset ink setting, Ph D thesis, Dec. 2006.*
Yu Rong et al., Encapsulation of titanium dioxide particles by polystyrene via radical polymerization, Colloids and Surfaces A 253, 2005, p. 195-197.*
Chunzhao Li, et al., "Synthesis of Well-Defined Polymer Brushes Grafted onto Silica Nanoparticles via Surface Reversible Addition-Fragmentation Chain Transfer Polymerization," Macromolecules (2005), 38(14), 5929-5936.
A. Kiehl, et al., "Encapsulated aluminium pigments," Progress in Organic Coatings (1999), 37(3-4), 179-183.
Alex Capuz, et al., "New-generation of silica-encapsulated ultramarine blues, high-performance pigments for coatings," Pitture e Vernici, European Coatings (2008), 84(12), 29/68-32/68.

* cited by examiner

*Primary Examiner* — Angela Ortiz
*Assistant Examiner* — Ruiyun Zhang

(57) ABSTRACT

A polymer-encapsulated pigment and a method of modifying a pigment use functional groups of an interface layer to attach a polymer to a pigment composition. The polymer-encapsulated pigment includes a pigment composition, a polymer and an interface layer. In the polymer-encapsulated pigment and the method, the interface layer is covalently attached to an outer surface of the pigment composition. The polymer is attached to the interface layer with a linking group. The linking group is attached to the interface layer by a covalent bond of a functional group. The linking group includes a nucleophilic carbon atom to which the polymer is covalently attached.

20 Claims, No Drawings

POLYMER-ENCAPSULATED PIGMENT

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers are now very common and affordable and allow one to obtain decent print quality. They are used in home printing, office printing and commercial printing. The growth of inkjet printing is the result of a number of factors including reductions in cost of inkjet printers and improvements in print resolution and overall print quality. A continued demand in inkjet printing has resulted in the need to produce images of high quality, high permanence and high durability while maintaining a reasonable cost.

One particular area of interest for achieving the above goals is the modification of the surface of pigments for enhancing the properties of these pigments for use in, for example, inkjet printing. Surface incompatibilities among pigments are present because of the variation in, for example, the chemical composition among pigments and because of the variation in the nature of processing techniques employed by manufacturers. The surface of pigments contains a variety of different functional groups, and the types of groups present depend on the specific class of pigment.

Various techniques are known for changing the surface properties of pigments. While it is known to encapsulate pigments in polymers, the choices of polymeric materials are limited by the process conditions and, although encapsulation can be achieved, the encapsulating layers are almost always different.

DETAILED DESCRIPTION

Some embodiments of the present invention are directed to polymer-encapsulated pigments, which comprise a pigment composition, a polymer and an interface layer. In the polymer-encapsulated pigment, the interface layer is covalently attached to the pigment composition. A linking group is attached to the interface layer by a covalent bond of a functional group and the linking group further comprises a nucleophilic carbon atom. The polymer is covalently attached to the nucleophilic carbon atom. In some embodiments the nucleophilic carbon atom is alpha to a carbonyl group of a carboxy derivative.

Some embodiments of the present invention are directed to methods for modifying a pigment. A surface of the pigment is contacted with an interface layer. The interface layer comprises functional groups. The contacting is carried out under conditions wherein at least a portion of the functional groups react with the surface to covalently attach the interface layer to the surface. The pigment is contacted with a polymerization agent under conditions for covalently attaching the agent to a portion of the functional groups of the interface layer. The pigment is contacted with at least one monomer under conditions for conducting a polymerization reaction to form a polymer covalently attached to a residue of the polymerization agent. In some embodiments the polymerization is a living polymerization.

Some embodiments of the present invention are directed to polymer-encapsulated pigments, which comprise a polymer, a pigment composition and an interface layer. The interface layer is covalently attached to the pigment composition and a linking group is covalently attached to the interface layer by a silyl ether linkage. The linking group further comprises a carboxy ester and the polymer is covalently attached to a carbon atom that is alpha to a carbonyl carbon atom of the carboxy ester.

Some embodiments of the present invention are directed to an ink composition comprising an ink vehicle and a polymer-encapsulated pigment as described above.

A pigment composition in accordance with present embodiments comprises at least one pigment or at least two pigments or at least three pigments, for example. The number of pigments in the pigment composition is in the range of 1 to about 5, or 1 to about 4, or 1 to about 3, or 1 to 2, or about 2 to about 5, or about 2 to about 4, or 2 to 3, for example. A pigment is a substance that changes the color of light that the substance reflects as the result of selective color absorption. The pigment may or may not impart a color. The pigment composition can include black pigment-based inks and colored pigment-based inks (e.g., blue, brown, cyan, green, white, violet, magenta, red, orange, yellow, as well as mixtures thereof). The pigment composition may include other materials such as, for example, one or more of ceramics, extender pigments (e.g., silicas, clays, alkaline earth metal sulfates such as calcium sulfate and barium sulfate), stabilizers, and corrosion inhibitor pigments (e.g., aluminum phosphate and calcium modified silica).

The pigment may be an inorganic pigment or an organic pigment or a combination thereof such as, for example, an organometallic material or a combination of two or more separate pigments. Examples of inorganic pigments, by way of illustration and not limitation, include metals, metalloids, metal oxides, metalloid oxides, metal sulfides, metalloid sulfides, metal alloys; metals, metalloids or metal alloys coated with a metal oxide or metalloid oxide or a metal sulfide or metalloid sulfide; metal carbides; metal nitrides; and metal borides, and combinations of two or more of the above, for example. The metal may be, for example, aluminum, zinc, tin, copper, iron, titanium, steel, zirconium, tin, iron (e.g., red iron, yellow iron, and black iron), gold-bronze or barium and/or alloys of the aforementioned metals. Metalloids include, for example, silicon. Metal oxides include, for example, titanium oxide, iron oxide, aluminum oxide, and zinc oxide. Metalloid oxides include silica (silicon oxide), for example. Other inorganic pigments include, for example, carbon black pigments, ultramarine blue, Prussian blue, molybdate reds, chrome yellows, cadmium yellows, and chrome oxides.

Organic pigments include, by way of illustration and not limitation, perylenes, phthalo green, phthalo blue, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments, anthraquinones, phthalocyanine blues, phthalocyanine greens, pyranthrones, heterocyclic yellows, bisindolidione pigments, and (thio)indigoid pigments, and mixtures of two or more thereof.

The pigment is generally particulate in nature. The size of the particulate pigment depends primarily on the nature of the pigment (organic, inorganic, or organometallic). The size of the pigment particles is about 10 to about 1,000 nanometers (nm), or about 10 to about 750 nm, or about 10 to about 500 nm, or about 10 to about 250 nm, or about 10 to about 150 nm, or about 50 to about 1,000 nanometers (nm), or about 50 to about 750 nm, or about 50 to about 500 nm, or about 50 to about 250 nm, or about 50 to about 150 nm, or about 100 to about 1,000 nanometers (nm), or about 100 to about 750 nm, or about 100 to about 500 nm, or about 100 to about 250 nm, or about 100 to about 150 nm, for example.

The interface layer is a substance comprising one or more different types of functional groups for covalently attaching the interface layer to the surface of a pigment composition and to a polymer through the intermediacy of a linking group. The interface layer permits uniformity in the resulting encapsulated pigments because differences between pigments are compensated for by the interface layer. The functional groups of the interface layer may be, for example, hydroxyl, sulfhydryl, carboxyl, amino, nitride, carbide, boride, borate, or boronic acid. The interface layer may be inorganic or organic.

Examples of substances that can be employed as an inorganic interface layer, by way of illustration and not limitation, include metal oxides, metalloid oxides, metal sulfides, metal selenides, metalloid sulfides, metal borides, metal borates, metal nitrides, and metal carbides, for example. Metal oxides include, for example, titanium oxide, iron oxide, aluminum oxide, zinc oxide, and magnesium oxide. Metalloid oxides include silica (silicon oxide), for example.

The metal oxides or metalloid oxides either contain a sufficient number of hydroxyl groups to provide for covalently binding to pigments and functionalized linking groups or hydroxyl groups may be introduced onto the surface of the metal oxide or metalloid oxide. Introduction of hydroxyl groups may be accomplished by methods known in the art such as, for example, plasma treatment, acidification techniques, and saponification.

The term "silicon oxide" or "silica" includes the various molecular forms of silicon oxide, for example, silicon monoxide, silicon dioxide, silicon tetraoxide, and polymers (for example, dimers, trimers, tetramers, and pentamers) thereof. In some embodiments the silicon oxide is silicon dioxide in the form of fumed silica or silica gel. These latter substances are hygroscopic and take on water thereby introducing hydroxyl groups onto the surface of the silicon dioxide. The relatively high surface area of fumed silica particles and silica gel particles facilitates the absorption of water, which introduces sufficient number of hydroxyl groups for reaction with corresponding functional groups on the surface of the pigment and on the linking group.

The metal sulfides or metalloid sulfides either contain a sufficient number of sulfhydryl groups to provide for covalently binding to pigments and functionalized linking groups or sulfhydryl groups may be introduced onto the surface of the metal sulfide or metalloid sulfide. Introduction of sulfhydryl groups may be accomplished by methods known in the art such as, for example, plasma treatment, acidification techniques, sulfurization of pigments containing aromatic groups via Herz reaction, reacting diazonium pigments with sodium thiol, and addition of hydrogen sulfide to pigments containing unsaturated double bonds (alkenes). Binding between sulfhydryl groups and hydroxyl groups results in a silyl thioether linkage.

Metal carbides and metal borides may be treated to introduce hydroxyl groups on a surface on the metal carbide or the metal boride by means of processes similar to those previously mentioned such as, for example, plasma and acid treatments.

For metal nitrides, hydroxyl groups may also be introduced to the pigment surface by oxidative etching such as plasma and acid treatments.

The interface layer may be an organic substance as long as it comprises the requisite functional groups for reaction with a corresponding functional group on the pigment and on the linking group. Examples of organic interface layer materials include, for example, polyhydroxyl polymeric materials (e.g., cellulose, alkyl cellulose, polyols).

The thickness of the interface layer is about 10 to about 500 angstroms, or about 10 to about 300 angstroms, or about 50 to about 250 angstroms, or about 50 to about 200 angstroms, or about 50 to about 100 angstroms, or about 20 to about 100 angstroms, or about 20 to about 50 angstroms, for example.

The covalent attachment of the interface layer to the pigment usually results in an inner surface of the interface layer being covalently attached to an outer surface of the pigment composition. The nature of the covalent attachment depends on one or more of the nature of the functional groups on the pigment composition, the nature of the functional groups on the interface layer, the density of functional groups on the pigment surface, the stoichiometric ratio of reactants to pigments surface functional groups, and the reactivity of the selected interface precursor with functional groups of the pigment surface, for example. For metal oxide pigments and metalloid oxide pigments, the oxide oxygen atoms on the surface of the pigment may be reacted with a hydroxyl group of the interface layer. Alternatively, hydroxyl groups may be present on the surface of the particulate pigment or hydroxyl groups may be introduced on the surface of the particulate pigment. Introduction of hydroxyl groups may be carried out by one or more of the methods discussed above. Hydroxyl groups may be reacted with a functional group on the interface layer such as, for example, an oxide oxygen of a metal oxide interface layer or a metalloid oxide surface layer to form an ether; a carboxyl or acyl halide of the interface layer to form an ester; or an isocyanate of the interface layer to form urethane.

In some embodiments the interface layer is covalently bound to the surface of a particulate pigment by employing an interface layer precursor, which comprises functional groups that are reactive with the surface of the particulate pigment and, after a reaction therewith, result in the covalent attachment of the interface layer. An example, by way of illustration and not limitation, is the reaction of an alkoxysilane with a metal oxide or a metalloid oxide pigment to give a layer of silica on the surface of the particulate pigment. Other examples of interface layer precursors include, for example, reacting the hydroxyl groups on aluminum oxide pigments with isocyanates to form carbamate linkages.

The term "alkoxy" as used herein means an alkyl group bound through a single, terminal oxygen ether linkage to another atom such as a carbon atom, or a silicon atom, for example. The alkyl group of the alkoxy has 1 to about 10 carbon atoms, or 1 to about 9 carbon atoms, or 1 to about 8 carbon atoms, or 1 to about 7 carbon atoms, or 1 to about 6 carbon atoms, or 1 to about 5 carbon atoms, or 1 to about 4 carbon atoms, or 1 to about 3 carbon atoms, or 1 to 2 carbon atoms, or 2 to about 10 carbon atoms, or 2 to about 5 carbon atoms, or 2 to about 4 carbon atoms, or 2 to 3 carbon atoms, for example. As used herein, the term "alkoxy" includes, for example, methoxy, ethoxy, n-propoxy, isopropoxy, and t-butoxy. In one embodiment, for example, the number of alkoxy groups on a silicon atom may be 1 to about 4, or 1 to about 3, or 1 to 2, or 2 to about 4, or 2 to 3, or 3 to 4, for example. The number of alkoxy groups on a silicon atom is dependent on the nature of the surface of the particulate pigment, for example.

In some embodiments a sol/gel process is employed to provide an interface layer on a particulate metal oxide or metalloid. A metal oxide or a metalloid oxide pigment is dispersed in an alcoholic solvent such as, for example, aqueous methanol, aqueous ethanol, aqueous propanol, aqueous isopropanol, and aqueous ethylene glycol where the percentage of alcohol in water is about 10% to about 100%, or about 20% to about 100%, or about 30% to about 80%, for example. Depending on the amount of water in the alcoholic solvent, each of water, a catalyst (e.g., a basic catalyst such as ammonium hydroxide, potassium hydroxide, or sodium hydroxide) and an alkoxysilane are added to the dispersed metal oxide or metalloid oxide. The mixture is heated at a temperature of about 5° C. to about 99° C., or from about 15° C. to about 70° C., or from about 20° C. to about 45° C., or from about 20° C. to about 30° C., or about ambient temperature, for example, for a period of about 1 second to about 60 minutes, or about 1 second to about 30 minutes, or about 1 second to about 15 minutes, or about 1 second to about 10 minutes, or about 1 second to about 5 minutes, or about 1 second to about 1 minute, for example.

In some embodiments, the chemical composition of the interface layer is different from the chemical composition of the particulate pigment. For example, where a pigment is an inorganic substance such as, for example, a metal oxide or a metalloid oxide, the interface layer of different chemical composition may be a metal oxide or a metalloid oxide where the metal or metalloid is different from the metal or metalloid of the pigment composition. In a particular example, by way of illustration and not limitation, the particulate pigment is a metal oxide or metalloid oxide such as, for example, aluminum oxide or iron oxide, and the interface layer is a metal oxide or a metalloid oxide such as, for example, silica (silicon oxide). In another particular example, by way of illustration and not limitation, the pigment is an organic pigment and the interface layer is a metal oxide or a metalloid oxide.

A linking group provides covalent linkage of the polymer to the interface layer. Thus, the linking group is covalently attached to an outer surface of the interface layer and also covalently attached to the polymer. The linking a group may comprise about 3 to about 100 atoms, or about 3 to about 70 atoms, or about 3 to about 50 atoms, or about 3 to about 20 atoms, or about 3 to about 10 atoms, or about 5 to about 100 atoms, or about 5 to about 70 atoms, or about 5 to about 50 atoms, or about 5 to about 20 atoms, or about 5 to about 10 atoms, not counting hydrogen. The atoms are each independently selected from the group normally consisting of carbon and heteroatoms such as, for example, oxygen, sulfur, nitrogen, halogen and phosphorous. The number of heteroatoms in the linking group may range from 0 to about 10, or from 1 to about 10, or from 1 to about 6, or from 1 to about 5, or from 1 to about 4, or from 1 to about 3, or from 1 to 2, or from 0 to about 5, or from 0 to about 4, or from 0 to about 3, or from 0 to 2 or from 0 to 1. The length of a particular linking group can be selected to provide for convenience of synthesis. In some embodiments the linking groups may be aliphatic or aromatic and counterparts thereof comprising one or more heteroatoms. The length (as a chain of atoms) of the linking group in some embodiments is about 3 to about 50 atoms, or about 3 to about 40 atoms, or about 3 to about 30 atoms, or about 3 to about 20 atoms, or about 3 to about 10 atoms, or about 5 to about 50 atoms, or about 5 to about 40 atoms, or about 5 to about 30 atoms, or about 5 to about 20 atoms, or about 5 to about 10 atoms, for example.

The linking group comprises a functional group that reacts with a corresponding functional group of the interface layer to provide for covalent attachment of the linking group to the interface layer, usually an outer surface of the interface layer as opposed to an inner surface of the interface layer that is defined by attachment of the interface layer to the pigment composition. The nature of the covalent attachment depends on one or more of the nature of the functional groups on the linking group, the nature of the functional groups on the interface layer, the reactivity of the functional groups towards the linker, and density of the functional groups on the interface layer, for example.

Functional groups, by way of illustration and not limitation, include hydroxyl groups, reactive siloxanes, primary, secondary or tertiary amines, nitrile groups, isonitrile groups, cyanate groups, isocyanate groups, thiocyanate groups, isothiocyanate groups, azide groups, thio groups, thiolate groups, sulfide groups, sulfinate groups, sulfonate groups, phosphate groups, alcoholate groups, phenolate groups, carbonyl groups, carboxylate groups, phosphine groups, phosphine oxide groups, phosphonic acid groups, phosphoramide groups, phosphate groups, phosphite groups, as well as combinations and mixtures of such groups. Most of the above functional groups can also be utilized for covalently attaching the interface layer to the surface of a particulate pigment, as referred to above. A reactive siloxane group is a group that comprises a silicon atom and at least one of an oxygen atom, a halogen (e.g., chlorine) atom, a triflate group, a tosylate group, a mesylate group, for example, and one or more functional groups that render the siloxane more reactive with a hydroxyl group. Such functional groups include, for example, alkoxy, chloro, bromo, iodo, triflate, toluene sulfonyl, and methanesulfonyl.

The nature of the functionality formed by the reaction of the functional groups depends on the nature of the functional groups. For example, the reaction of hydroxyl anion groups with carbon atoms bearing a hydroxyl group yields alkyl ethers, the reaction of hydroxyl groups with reactive siloxane groups yields silyl ethers; the reaction of hydroxyl groups with carboxylic acids or derivatives thereof yields carboxylic acid esters; the reaction of amine groups with carboxylic acid groups yields amides; and the reaction of hydroxyl groups with isocyanates forma a urethane.

For an interface layer that is a metal oxide or metalloid oxide, the oxide oxygen atoms react with a hydroxyl group of the linking group under appropriate conditions. Alternatively, hydroxyl groups may be present on the interface layer or hydroxyl groups may be introduced on the surface of the interface layer. Introduction of hydroxyl groups may be carried out by one or more of the methods discussed above. Hydroxyl groups may be reacted with a functional group on the interface layer such as, for example, an oxide oxygen of a metal oxide interface layer or a metalloid oxide surface layer to form an ether, a carboxyl group of the interface layer to form an ester, or an isocyanate group of the interface layer to from a urethane.

In some embodiments the functional group of the interface layer that provides for covalent attachment of the interface layer to a particulate pigment is the same functional group that provides for covalent attachment of the interface layer to the linking group. In such a situation, not all of the molecules of the functional group of the interface layer are reacted with the particulate pigment. In some embodiments, only about 20% to about 100% or about 30% to about 90%, or about 40% to about 80%, or about 50% to about 70%, or about 40% to about 70%, or about 50% to about 60% of the functional groups of the interface layer are reacted with the particulate pigment.

In some embodiments the interface layer is covalently bound to the linking group that comprises a reactive siloxane such as, for example, an alkoxysilane. The alkoxysilane may be a mono-, di- or tri-alkoxysilane.

In some embodiments the functional group of the interface layer is a hydroxyl group and the functional group of the linking group is an alkoxysilane, and the resulting product is a silyl ether. An example, by way of illustration and not limitation, is the reaction of an alkoxysilane with a metal oxide or a metalloid oxide interface layer. In another example, the interface layer is a metal borate, which reacts with trialkoxy-silane to yield a borosilicate. Other embodiments of functional groups on the linking group include methoxysilane, silyl chloride and silyl triflate, which react with free hydroxyl groups in the presence of a base to give silyl ether linkages.

In addition to the functional group, which provides for covalent attachment of the linking group to the interface layer, the linking group further comprises a nucleophilic carbon atom. The term "nucleophilic carbon atom" refers to a carbon atom that is reactive to an electrophilic group. The nucleophilic carbon atom has at least one substituent that increases the negative charge of the carbon atom compared to the negative charge of the carbon atom without such substituent. Substituents that increase the negative charge of the carbon atom include, for example, a carbonyl group of a carboxy derivative (an ester, an amide, an imide, a carbamate, a carbonate, a urea, an acid, and a hydrazide), an aromatic group (e.g., phenyl, naphthyl, anthracenyl, pyrenyl and phenanthrenyl and substituted derivatives thereof), an ether group, an azo group, a diazo group, and an amino group, for example.

The term "aromatic" includes monocyclic rings, bicyclic ring systems, and polycyclic ring systems, in which the monocyclic ring, or at least a portion of the bicyclic ring system or polycyclic ring system, exhibit aromatic characteristics, e.g., π-conjugation. The monocyclic rings, bicyclic ring systems, and polycyclic ring systems of the aromatic group may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms. In some embodiments the aromatic group is phenyl (including substituted phenyl), substituted or non-substituted naphthalene, or pyrene, for example. In some embodiments the carboxy derivative is carboxy.

In some embodiments the linking group has the formula:

—(CHR)-A-(CH$_2$)$_n$-E-    I wherein:

A is a substituent that increases the negative charge of the carbon atom of CHR; in some embodiments A is selected from the group consisting of carbonyl group of a carboxy derivative (an ester, an amide, an imide, a carbamate, a carbonate, a urea, an acid, a thiourea, and a hydrazide, for example), phenyl, substituted phenyl, ether, azo, diazo, and amino;

E is a residue from a reaction of a functional group that is reactive with a functional group of an interface layer; in some embodiments, for example, E is an oxygen atom, which is a residue of the reaction of a hydroxyl group and an alkoxysilane group;

R is alkyl of 1 to 5 carbon atoms, or 1 to 4 carbon atoms, or 1 to 3 carbon atoms, or 1 to 2 carbon atoms; and n is 0 to 10, or 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example.

The phrase "residue from a reaction" means that the moiety in question comprises one or more atoms that were part of one or both of the functional groups that reacted to form the moiety. For example, an ether oxygen atom is the residue from the reaction of a hydroxyl group anion with the carbon atom bearing a hydroxyl group; or a silyl ether (silicon-oxygen) is the residue of the reaction of a siloxane and a hydroxyl group; or a C(O)O group is a residue of the reaction of a carboxylic acid and a hydroxyl group; or carbamate (urethane) is a residue of the reaction of an isocyanate and a hydroxyl group.

In some embodiments the linking group has the formula:

—(CHR)—C(O)O—(CH$_2$)$_{n'}$—Si(R$_1$)$_2$O—    II wherein R is defined as above:

R$_1$ is independently selected from the group consisting of hydrogen, alkyl of 1 to 5 carbon atoms, or 1 to 4 carbon atoms, or 1 to 3 carbon atoms, or 1 to 2 carbon atoms, and alkoxy of 1 to 5 carbon atoms, or 1 to 4 carbon atoms, or 1 to 3 carbon atoms, or 1 to 2 carbon atoms; in some embodiments both R$_1$s are alkyl; in some embodiments both R$_1$s are alkoxy; and n' is 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example; in some embodiments n' is 3.

In some embodiments the linking group has the formula:

—(CHR)-A$_1$-(CH$_2$)$_{n''}$—Si(R$_1$)$_2$O—    III wherein:

A$_1$ is ortho-, meta- or para-phenyl;

R is alkyl of 1 to 5 carbon atoms, or 1 to 4 carbon atoms, or 1 to 3 carbon atoms, or 1 to 2 carbon atoms;

R$_1$ is independently selected from the group consisting of hydrogen, alkyl of 1 to 5 carbon atoms, or 1 to 4 carbon atoms, or 1 to 3 carbon atoms, or 1 to 2 carbon atoms, and alkoxy of 1 to 5 carbon atoms, or 1 to 4 carbon atoms, or 1 to 3 carbon atoms, or 1 to 2 carbon atoms; in some embodiments both R$_1$s are alkyl; in some embodiments both R$_1$s are alkoxy; and n" is 0 to 10, or 0 to 9, or 0 to 8, or 0 to 7, or 0 to 6, or 0 to 5, or 0 to 4, or 0 to 3, or 0 to 2, or 0 to 1, or 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example; in some embodiments n" is 0, and in some embodiments n" is 1, and in some embodiments n" is 2, and in some embodiments n" is 3.

As mentioned above, in the present embodiments of an encapsulated pigment, a polymer is covalently attached to the nucleophilic carbon atom of the linking group. The polymer is generally about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The term "monomer" means a molecule capable of undergoing polymerization to form a polymer. The number of monomer units depends on one or more of the number of atoms in the monomer unit chain and the composition of the monomer unit, for example.

The molecular weight of the polymer is about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, for example. In some embodiments, the monomer units of the polymer comprise carbon atoms and may additionally comprise one or more heteroatoms such as, for example, oxygen, sulfur, nitrogen, phosphorus, and silicon.

The polymer may be linear or branched or a combination thereof. A linear polymer comprises a linear chain of atoms and a branched polymer comprises a branched chain of atoms. Each atom of the linear chain may have one or more substituents in place of hydrogen. In some embodiments, the polymer may be a copolymer comprising more than one type of monomer unit. The relationship of the different monomer units in the polymer may be alternating, random, and periodic for example, and may also be in a block copolymer arrangement where blocks of repeating monomer units form the polymer chain.

In some embodiments the polymer encapsulating material is a latex polymer. The latex polymer of the polymer encapsulation may be derived from a number of monomers such as, by way of example and not limitation, vinyl monomers, allylic monomers, olefins, and any small molecules containing at least one degree of unsaturation but not an aromatic, and mixtures thereof. Classes of vinyl monomers include, but are not limited to, methacrylic acid, methacrylates, methacrylamide, N- and N,N-disubstituted methacrylamides, vinyl aromatic monomers, vinyl halides, vinyl esters of carboxylic acids (e.g., vinyl acetate), ethylene oxide acrylates, diacrylates, and dimethacrylates.

Examples of methacrylates include, but are not limited to, methyl methacrylate, ethyl methacrylate, propyl methacrylate, isopropyl methacrylate, n-butyl methacrylate, iso-butyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, isocane methacrylate, glycidyl methacrylate, 3,4-epoxycyclohexylmethylmethacrylate, 2-(3,4-epoxycyclohexyl)ethylmethacrylate, hydroxyethyl methacrylate, hydroxypropyl methacrylate, hydroxybutyl methacrylate, methacrylic anhydride, diethyleneglycol bismethacrylate, 4,4'-isopropylidenediphenol bismethacrylate (Bisphenol A dimethacrylate), alkoxylated 4,4'-isopropylidenediphenol bismethacrylate, trimethylolpropane trismethacrylate and alkoxylated trimethylolpropane trismethacrylate.

Examples of vinyl aromatic monomers that may be used include, but are not limited to, styrene, styrene-butadiene, p-chloromethylstyrene, divinyl benzene, vinyl naphthalene and divinyl naphthalene. Vinyl halides that may be used include, but are not limited to, vinyl chloride and vinylidene fluoride. Vinyl esters of carboxylic acids that may be used include, but are not limited to, vinyl acetate, vinyl butyrate, vinyl 3,4-dimethoxybenzoate, vinyl malate and vinyl benzoate.

The polymer may be covalently attached to the nucleophilic carbon atom of the linking group by a polymerization method employing one or more of the aforementioned monomers. In some embodiments a living polymerization technique is employed that provides for polymer chain growth at a more constant rate than in traditional chain polymerization. In addition, the chain lengths remain similar with living polymerization techniques. Examples of suitable polymerization methods, by way of illustration and not limitation, include reversible addition fragmentation chain transfer (RAFT) polymerization, free radical polymerization, transition metal catalyzed coupling, living radical polymerization, addition (chain reaction) polymerization (anionic, cationic, and ring-opening, for example), step-growth polymerization, plasma polymerization, condensation reactions, metathesis, cycloaddition reactions such as 1,3 dipolar cycloaddition commonly known as "Click chemistry," for example.

The concentrations of the various reagents employed in the above reactions will generally be determined by one or more of the nature of the particulate pigment, the nature of the interface layer, the thickness of the interface layer, the nature of the polymerization technique employed, the desired length of the polymer, the glass transition temperature of the resulting polymer, the density of atomic composition on the surface of the encapsulant, and intrinsic properties of the final pigment such as one or more of optical density, color index, particle surface polarity, electrical and conductivity of the final product, for example.

The polymer-encapsulated pigments formed as described above may be treated to purify them, and separate them, for example, from a reaction medium. One or both of separation and/or purification may be accomplished by techniques such as filtration, centrifugation, or washing, or a combination thereof, for example. The size of the polymer-encapsulated pigment particles is about 100 to about 1000 nanometers (nm), or about 100 to about 750 nm, or about 100 to about 500 nm, or about 100 to about 250 nm, or about 150 to about 1000 nanometers (nm), or about 150 to about 750 nm, or about 150 to about 500 nm, or about 150 to about 250 nm, for example.

In some embodiments a monomer is polymerized at the nucleophilic carbon atom by RAFT polymerization employing a polymerization agent that comprises a dithio ester or trithio ester at a nucleophilic carbon atom. In some embodiments the polymerization agent has the formula:

$$R_2—C(S)S—(CHR)-A-(CH_2)_n-G \qquad IV$$

wherein:

A is a substituent that increases the negative charge of the carbon atom of CHR; in some embodiments A is selected from the group consisting of a carbonyl group of a carboxy derivative (an ester, an amide, an imide, a carbamate, a carbonate, a urea, an acid, a thiourea, and a hydrazide, for example), a phenyl group, a substituted phenyl group, an ether group, an azo group, a diazo group, and an amino group;

G is a functional group that is reactive with a functional group of an interface layer; in some embodiments, for example, G is an alkoxysilane group, a hydroxyl group, or an amine group;

R is alkyl of 1 to 5 carbon atoms, or 1 to 4 carbon atoms, or 1 to 3 carbon atoms, or 1 to 2 carbon atoms;

$R_2$ is an aromatic ring (for example, phenyl, naphthalene, anthracene, pyrene, fluorene, and substituted derivatives thereof), an alkyl of 1 to 5 carbon atoms, or 1 to 4 carbon atoms, or 1 to 3 carbon atoms, or 1 to 2 carbon atoms, an alkoxy of 1 to 5 carbon atoms, or 1 to 4 carbon atoms, or 1 to 3 carbon atoms, or 1 to 2 carbon atoms; and n is 0 to 10, or 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example.

In some embodiments a monomer is polymerized at the nucleophilic carbon atom by RAFT polymerization employing a polymerization agent that comprises a dithio ester at a nucleophilic carbon atom. In some embodiments the polymerization agent has the formula:

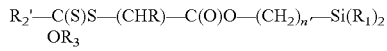

wherein:

R is alkyl of 1 to 5 carbon atoms, or 1 to 4 carbon atoms, or 1 to 3 carbon atoms, or 1 to 2 carbon atoms; and $R_1$ is independently selected from the group consisting of hydrogen, alkyl of 1 to 5 carbon atoms, or 1 to 4 carbon atoms, or 1 to 3 carbon atoms, or 1 to 2 carbon atoms, and alkoxy of 1 to 5 carbon atoms, or 1 to 4 carbon atoms, or 1 to 3 carbon atoms, or 1 to 2 carbon atoms; in some embodiments both $R_1$s are alkyl; in some embodiments one $R_1$ is alkyl and the other is alkoxy; in some embodiments both $R_1$s are alkoxy;

$R_2'$ is an aromatic ring; in some embodiments $R_2'$ is phenyl or substituted phenyl;

$R_3$ is alkyl of 1 to 5 carbon atoms, or 1 to 4 carbon atoms, or 1 to 3 carbon atoms, or 1 to 2 carbon atoms; and n' is 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example; in some embodiments n' is 3.

Using RAFT technology, polymers can be synthesized with predetermined molecular weight and narrow molecular weight distributions over a wide range of monomers. RAFT can be used in all modes of free radical polymerization including solution, emulsion and suspension polymerizations. A RAFT polymerization agent is employed and it is this agent that results in the residue, which is the linking group referred to above.

In addition to the RAFT polymerization agent, a polymerization initiator is also employed. The polymerization initiator is a radical initiator, examples of which include, by way of illustration and not limitation, azobisisobutyronitrile (AIBN), benzoyl peroxide, or 1,1'-Azobis(cyclohexanecarbonitrile) (ABCN), for example.

With regard to the present embodiments, the mechanism of RAFT begins with a standard initiation step where homolytic bond cleavage of the polymerization initiator molecule yields a reactive free radical at the nucleophilic carbon atom of the RAFT polymerization agent. This free radical then reacts with a molecule of the monomer to form the active center with additional molecules of monomer then adding in a sequential fashion to produce a growing polymer chain. The propagating chain adds to the polymerization agent to yield a radical intermediate. Fragmentation of this intermediate gives rise to either the original polymer chain or to a new radical, which itself must be able to reinitiate polymerization. This free radical generates its own active center by reaction with the monomer and eventually a new propagating chain is formed. The length of the chain is controlled by controlling the concentration of the monomer, the concentration of the polymerization initiator, and the stoichiometric ratios of the above with respect to the RAFT agent, for example.

In an embodiment a particulate pigment is coated with a metal oxide or a metalloid oxide to form an interface layer that is covalently attached to the particle pigment. Covalent attachment of the metal oxide or metalloid oxide may be achieved as discussed above. The pigment particle with coated interface layer is treated under conditions to covalently attach a RAFT polymerization agent to the interface layer. The coated pigment particle is combined with a RAFT polymerization agent in a suitable organic solvent, which may be, for example, a ketone (e.g., methyl ethyl ketone, methyl isopropyl ketone, and methyl isobutyl ketone), or an alcohol, (e.g., ethanol, 2-propanol, heptanol, hexanol, or ethylene glycol).

The reaction is conducted at an elevated temperature during the reaction. For example, the temperature may be about 25° C. to about 250° C., or from about 25° C. to about 200° C., or from about 25° C. to about 150° C., or from about 25° C. to about 100° C., for example. The temperature employed depends on the nature of the polymerization agent, the nature of the solvent, and thermal stability of the materials, for example. The time period for the reaction may be about 1 minute to about 10 hours, or about 30 minutes to about 10 hours, or about 1 hour to about 10 hours, or about 2 hours to about 10 hours, or about 3 hours to about 10 hours, or about 3 hours to about 8 hours, or about 3 hours to about 6 hours, or about 3 hours to about 5 hours, for example.

The coated pigment particle with a covalently attached RAFT polymerization reagent is combined with a polymerization initiator and a monomer. The mixture is subjected to conditions for polymerizing the monomers to form polymer covalently attached to the interface layer by a linking group that is a residue of the RAFT polymerization agent. The polymerization reaction is conducted at an elevated temperature. For example, the temperature may be about 25° C. to about 250° C., or from about 25° C. to about 200° C., or from about 25° C. to about 150° C., or from about 25° C. to about 100° C., for example. The temperature employed depends on one or more of the nature of the polymerization agent, the nature of the polymerization initiator, and thermal stability of the materials, for example. The time period for the reaction may be about 1 hour to about 30 hours, or about 2 hours to about 30 hours, or about 3 hours to about 30 hours, or about 4 hours to about 30 hours, or about 5 hours to about 30 hours, or about 6 hours to about 30 hours, or about 7 hours to about 30 hours, or about 8 hours to about 30 hours, or about 8 hours to about 24 hours, for example.

In an embodiment a polymer-encapsulated pigment includes an aluminum oxide pigment (average diameter 100 nm) with a silica coating interface layer (0.02 μm thick) covalently attached to the surface of the aluminum oxide pigment by silyl ether linkages. A linking group that is a residue of a RAFT polymerization agent is covalently attached to the interface layer and a latex polymer is attached to a nucleophilic carbon atom of the residue. In an embodiment of the above, the polymer-encapsulated pigment (prepared as described above) has the following structure:

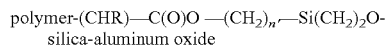

wherein R and n' are as defined above.

In an embodiment a polymer-encapsulated pigment includes a titanium oxide pigment (average diameter 350 nm) with an aluminum borate coating as an interface layer (0.05 μm thick) covalently attached to the surface of the titanium oxide pigment by borosilicate linkages. A linking group that is a residue of a RAFT polymerization agent is covalently attached to the aluminum borate interface layer and a latex polymer is attached to a nucleophilic carbon atom of the residue. In one specific embodiment of the above, the polymer-encapsulated pigment has the following structure:

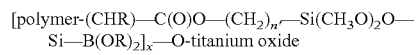

wherein R and n' are as defined above and x is 1 to 10, or 1 to 9, or 1 to 8, or 1 to 7, or 1 to 6, or 1 to 5, or 1 to 4, or 1 to 3, or 1 to 2, or 2 to 10, or 2 to 9, or 2 to 8, or 2 to 7, or 2 to 6, or 2 to 5, or 2 to 4, or 2 to 3, or 3 to 10, or 3 to 9, or 3 to 8, or 3 to 7, or 3 to 6, or 3 to 5, or 3 to 4, for example.

The above polymer-encapsulated pigment is prepared as follows: 5 g titanium oxide pigment is vacuum dried prior to dispersing as a suspension in freshly distilled THF by mechanical stirring and the reaction is kept under dry argon. Subsequently 0.38 mL of borontribromide is added to the dispersion dropwise at −10° C. After constant stirring for 15 minutes, the dispersion is allowed to slowly reach room temperature and then is poured into ice-water. The pigment is then filtered, washed repeatedly with water, and dried in a vacuum oven overnight. The dried boronic acid functionalized titania is then redispersed and titrated with 0.1 M NaOH until pH 8 to 9, then a 3 mL THF solution containing 0.5 g of (3-(2-dithiopropionyl)propyl)dimethyl-methoxysilane RAFT agent is added dropwise to the aqueous dispersion of functionalized titanium oxide. The reaction is allowed to react at reflux for 6 hours, and then the hot solution is filtered, washed with water, and is lyopholized to give the RAFT-functionalized pigment for the final polymerization step. 2 g of the dried RAFT-functionalized pigment, 0.1 g AIBN, and 2 mL of acrylic monomers (styrene, hexamethacrylate, acrylic acid (1:1:1)) are allowed to stir in 50 mL of anhydrous THF under argon. The suspension, equipped with a reflux condenser, is allowed to proceed at 65° C. for 6 hours to give the encapsulated pigment VII.

In one embodiment a polymer-encapsulated pigment includes a pigment yellow 74 (P.Y.74) pigment (average diameter 300 nm) with an ethyl cellulose coating as an interface layer (see, for example, U.S. Pat. No. 4,808,230) (0.05 μm thick) covalently attached to the surface of the P.Y.74 pigment by ether linkages. The attachment of the interface layer may be accomplished by first treating the pigment with iodotrimethylsilane and then allowing the treated pigment to undergo a condensation reaction with ethyl cellulose, for example. A linking group that is a residue of a RAFT polymerization agent is covalently attached to the ethyl cellulose interface layer and a latex polymer is attached to a nucleophilic carbon atom of the residue. In an embodiment of the above, the polymer-encapsulated pigment has the following structure:

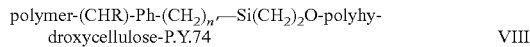

VIII wherein R and n' are as defined above, and Ph is a para-phenyl group.

The above polymer-encapsulated pigment VIII is prepared as follows: 20 g of pigment P.Y. 74 is suspended in 250 mL of freshly distilled THF and is kept protected from light and air. 10 mL of a deionized solution of 1 M potassium hydroxide is added to the dispersion to saponify the pigment for 30 minutes at reflux temperature. Then, a 100 mL THF solution containing 20 g of polyhydroxycellulose is added at once to this dispersion and allowed to stir at reflux temperature while removing water via azeotropic distillation for 6 hours. The functionalized pigment is then filtered, dried, and allowed to redispersed and is titrated with 0.1 M NaOH until pH 8 to 9. Then a 3 mL THF solution containing 0.5 g of (3-(2-dithiobenzoatepropionyl)propyl)dimethylmethoxysilane RAFT agent is added dropwise to the aqueous dispersion of functionalized P.Y. 74. The reaction is allowed to react at reflux for 6 hours, and then the hot solution is filtered, washed with water, and lyopholized to give the RAFT-functionalized pigment for the final polymerization step. 2 g of the dried RAFT-functionalized pigment, 0.1 g AIBN, and 2 mL of acrylic monomers (styrene, hexamethacrylate, acrylic acid (1:1:1)) are allowed to stir in 50 mL of anhydrous THF under argon. The suspension, equipped with a reflux condenser, is allowed to proceed at 65° C. for 6 hours to afford the titled encapsulated pigment VIII.

In an embodiment a polymer-encapsulated pigment includes a copper phthalocyanine (CuPc) pigment and has the following structure:

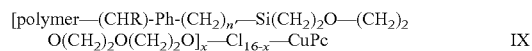

IX wherein R, Ph, n' and x are as defined above.

The above polymer-encapsulated pigment IX is prepared as follows: 10 g of ethylene glycol is dissolved in 20 mL of 2 M ammonium hydroxide and allowed to react at reflux temperature. This solution is then cannulated to a 250 mL of freshly distilled THF solution containing 50 g a suspension of perchlorinated copper phthalocyanine ($Cl_{16}$—CuPc) and kept protected from light and air. The mixture is stirred at reflux for 4 hours, then a 3 mL THF solution containing 0.5 g of (3-(2-dithiobenzoatepropionyl)propyl)dimethylmethoxysilane RAFT agent is added dropwise to the aqueous dispersion of functionalized chlorinated CuPc. The reaction is allowed to react at reflux for 6 hours, and then the hot solution is filtered, washed with water, and lyopholized to give the RAFT-functionalized pigment for the final polymerization step. 2 g of the dried RAFT-functionalized pigment, 0.1 g AIBN, and 2 mL of acrylic monomers (styrene, hexamethacrylate, acrylic acid (1:1:1)) are allowed to stir in 50 mL of anhydrous THF under argon. The suspension, equipped with a reflux condenser, is allowed to proceed at 65° C. for 6 hours to afford the titled encapsulated pigment IX.

In an embodiment a polymer-encapsulated pigment includes a carbon black pigment and has the following structure:

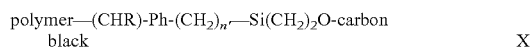

X wherein R, n' and Ph are as defined above.

The above polymer-encapsulated pigment X is prepared as follows: 50 g of carbon black pigment is subjected to acid treatment with 30 mL of concentrated sulfuric acid for 1 hour. The resulting slurry is poured into ice-water, filtered and washed thoroughly with water until filtrated came out neutral in pH. The resulting pigment paste is pressed and vacuum dried, and then is redispersed in water and titrated with 0.1 M KOH until pH 8 to 9. Subsequently, a 10 mL THF solution containing 2 g of (3-(2-dithiopropionyl)propyl)dimethyl-methoxysilane RAFT agent is added dropwise to the aqueous dispersion of functionalized pH carbon black. The reaction is allowed to react at reflux for 6 hours, and then the hot solution is filtered, washed with water, and lyopholized to give the RAFT-functionalized pigment for the final polymerization step. 2 g of the dried RAFT-functionalized pigment, 0.1 g AIBN, and 2 mL of acrylic monomers (styrene, hexamethacrylate, acrylic acid (1:1:1)) are allowed to stir in 50 mL of anhydrous THF under argon. The suspension, equipped with a reflux condenser, is allowed to proceed at 65° C. for 6 hours to afford the titled encapsulated pigment X.

The present compositions and methods reduce or avoid problems with surface incompatibilities among pigments of different chemical composition. The difficulties that are encountered due to differences in surface chemistries and polarities of various pigments are substantially overcome. In accordance with present embodiments the surface of different pigments is treated to introduce an interface layer that serves to provide more uniformity for subsequent attachment of a polymer. Polymer-encapsulated pigments can be prepared where the polymer is substantially the same across a wide variety of pigments.

The polymer-encapsulated pigments of the present embodiments are stable in an ink environment, which may be an aqueous medium or an oil-based medium. For example, the polymer-encapsulated pigments of the present embodiments find use in many different water-based systems such as coatings and inks The polymer-encapsulated pigments of the present embodiments may be used in most ink media known in the art. The ink compositions comprising the present polymer-encapsulated pigments provide a variety of colors depending on the nature of the pigment of the polymer-encapsulated pigments.

In some embodiments, the polymer-encapsulated pigment is employed in an aqueous medium, which is a water-based system that may or may not contain other solvents such as organic solvents. For example, the aqueous medium may contain organic solvents such as alcohols, ethers, esters, amides, glycols, or pyrrolidones, or mixtures of two or more organic solvents. The amount (by weight percent) of the organic solvent may be between about 0.01 and about 20%, or between about 0.01 and about 10% or between about 0.01 and about 5%, or about 0.1 and about 20%, or between about 0.1 and about 10% or between about 0.1 and about 5%, or about 1 and about 20%, or between about 1 and about 10% or between about 1 and about 5%. The aqueous medium may also optionally include one or more water-soluble surfactants in amounts ranging between about 0 and 5%, or between about 0.1 and about 5%, or about 0.5 and about 5%, or about 1 to about 5%. Examples of suitable surfactants include, by way of illustration and not limitation, fluorosurfactants, alkyl polyethylene oxides, non-ionic surfactants, amphoteric surfactants, ionic surfactants, and mixtures of two or more of the above. The balance of the aqueous medium is usually water. In an embodiment the aqueous medium comprises a mixture of water, glycol and a polymer-encapsulated pigment, for example, for most everyday printing applications.

In other embodiments, the ink composition comprising a polymer-encapsulated pigment in accordance with the present embodiments is a solvent-based ink made with volatile organic compounds. The organic solvent-based inks find use in printing of vinyl substrates (e.g., billboards and banners), graphic arts, printing of packaging materials, liquid electrophotography, and electrophoretic displays, for example.

The amount of the polymer-encapsulated pigment in the ink medium depends on one or more of the nature of the pigment, the nature of the polymer, the nature of the printing process, the nature of the ink medium, the desired optical density, the color or the pigment, and the tintorial strength of the pigments, for example. The amount (by weight percent) of the polymer-encapsulated pigment in the ink medium may be about 0.5 to about 20%, or about 0.5 to about 15%, or about 0.5 to about 10%, or about 0.5 to about 5%, or about 0.5 to about 3%, or about 1 to about 20%, or about 1 to about 15%, or about 1 to about 10%, or about 1 to about 5%, or about 1 to about 3%, or about 5 to about 20%, or about 5 to about 15%, or about 5 to about 10%, for example.

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited. Moreover, examples herein are intended to be illustrative only and are presented for discussion purposes and not by way of limitation.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "heteroatom" as used herein means nitrogen, oxygen, phosphorus or sulfur. The terms "halo" and "halogen" mean a fluoro, chloro, bromo, or iodo substituent. The term "cyclic" means having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

The term "alkyl" means a branched, unbranched, or cyclic saturated hydrocarbon group, which typically, although not necessarily, contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "alkyl" includes unsubstituted alkyl, substituted alkyl and heteroalkyl.

EXAMPLES

Unless otherwise indicated, materials in the experiments below may be purchased from Aldrich Chemical Company, St. Louis Mo. Parts and percentages are by weight unless indicated otherwise.

Example 1

A 3-neck, 1-L round bottom flask equipped with a reflux condenser, gas-inlet and outlet connecting to a drying tube is charged with 50 g of $SiO_2$-coated aluminum oxide pigment (Eckart Standart No. PC3D, from Eckart America Corporation, Painesville, Ohio). With the aid of a magnetic stir bar, the pigment is initially wetted with 480 mL of anhydrous methyl isobutyl ketone (MIBK) for 30 minutes; then, a 20 mL solution containing 1 g of (3-(2-dithiobenzoatepropionyl)propyl) dimethylmethoxysilane is added drop wise to the slurry via a syringe. The slurry is then subjected to heating to 100° C. for 5 to 24 hours. The reaction mixture is then allowed to cool to room temperature and is filtered through a Buchner funnel. The resultant solid is rinsed with 150 mL of MIBK, followed by 200 mL of acetone, to remove unreacted silane reagent. The resulting cake is then dried in a vacuum oven overnight and is re-dispersed in tetrahydrofuran (THF) via microfluidization or ultrasonication to prepare for polymerization. Upon collecting the dispersion into a round bottom flask equipped with a stir bar and a condenser, the setup is purged with dry Argon and is subjected to heating to 80° C. At this time, a 10 mL solution containing 0.5 g of AIBN and 50 mL of acrylic monomers (mixture of styrene, hexylmethacrylate, acrylic acid and ethylene glycol dimethacrylate (44:50:5:1)) are added to the slurry. The mixture is allowed to react for 8 to 24 hours until polymerization is complete. The final polymer-encapsulated pigments are filtered once again, are washed with 200 mL of THF and are dried in vacuum oven overnight to give a polymer-encapsulated pigment in a dried form.

Example 2

The dried polymer-encapsulated pigment prepared as discussed above in Example 1 is used to prepare an ink composition for use in an inkjet printer. An aqueous medium is prepared containing 2% 1,2-hexanediol and 1% fluorosurfactant (ZONYL® fluorosurfactant from E.I. du Pont de Nemours and Co., Wilmington Del.). To the aqueous medium is added the polymer-encapsulated pigment from Example 1 above so that the final concentration of the pigment in the aqueous medium is 2%. A print cartridge of an inkjet printer is filled with the ink medium from above and the ink medium is dispensed through the nozzles of the inkjet printer.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A polymer-encapsulated pigment comprising a polymer; a pigment composition; and an interface layer, the interface layer being covalently attached to an outer surface of the pigment composition, the polymer being attached to the interface layer with a linking group, wherein the linking group is attached to the interface layer by a covalent bond of a functional group, and wherein the linking group comprises a nucleophilic carbon atom to which the polymer is covalently attached, and wherein the interface layer is selected from the group consisting of metal borates, metal borides, metal nitrides, metal carbides, metal sulfides, metal selenides, metalloid sulfides and polyhydroxyl polymeric materials.

2. The polymer-encapsulated pigment according to claim 1, wherein the interface layer is selected from the group consisting of metal selenides, metal sulfides, metal nitrides, metal borides and metal carbides.

3. The polymer-encapsulated pigment according to claim 1, wherein the interface layer is selected from the group consisting of metal borates and polyhydroxycellulose.

4. The polymer-encapsulated pigment according to claim 1, wherein the pigment composition comprises at least one inorganic pigment.

5. The polymer-encapsulated pigment according to claim 1, wherein the pigment composition comprises at least one organic pigment.

6. The polymer-encapsulated pigment according to claim 1, wherein the interface layer has a chemical composition that is different from a chemical composition of the pigment composition.

7. The polymer-encapsulated pigment according to claim 1, wherein the interface layer has a thickness of about one to about ten nanometers.

8. An ink composition comprising an ink vehicle and the polymer-encapsulated pigment according to claim 1.

9. A method of preparing a polymer-encapsulated pigment, the method comprising:
   (a) contacting a surface of a pigment composition with an interface layer, the interface layer comprising functional groups, wherein the contacting is carried out under conditions wherein at least a portion of the functional groups react with the pigment composition surface to covalently attach the interface layer to the pigment composition surface, and wherein the interface layer is selected from the group consisting of metal borates, metal borides, metal nitrides, metal carbides, metal sulfides, metalloid sulfides and polyhydroxyl polymeric materials;
   (b) contacting the pigment composition with a polymerization agent under conditions for covalently attaching the polymerization agent to a portion of the functional groups of the interface layer by means of functional groups of a linking group covalently attached to the polymerization agent wherein the linking group comprises a nucleophilic carbon atom to which the polymerization agent is covalently attached; and
   (c) contacting the pigment composition with at least one monomer under conditions for conducting a polymerization reaction to form a polymer covalently attached to a residue of the polymerization agent.

10. The method according to claim 9, wherein the interface layer comprises hydroxyl groups, and wherein the polymerization agent is a reversible addition fragmentation chain transfer agent.

11. The method according to claim 9, wherein the interface layer is selected from the group consisting of metal borates and polyhydroxycellulose.

12. The method according to claim 9, wherein the pigment is an inorganic pigment.

13. A polymer-encapsulated pigment comprising: a polymer; a pigment composition; and an interface layer, the interface layer being covalently attached to the pigment composition, the polymer being attached to the interface layer with a linking group, wherein the linking group is attached to the interface layer by a covalent bond of a functional group, and wherein the linking group comprises a nucleophilic carbon atom to which the polymer is covalently attached, and wherein the linking group has the formula: —(CHR)-A-$(CH_2)_n$-E-, wherein A is phenyl, substituted phenyl, ether, azo, diazo, or amino, E is a residue from a reaction of a functional group that is reactive with a functional group of an interface layer, R is alkyl of 1 to 5 carbon atoms, and n is 0 to 10.

14. The polymer-encapsulated pigment according to claim 13, wherein the linking group has the formula: —(CHR)-$A_1$-$(CH_2)_{n''}$—Si$(R_1)_2$O—, wherein $A_1$ is ortho-, meta- or para-phenyl, R is alkyl of 1 to 5 carbon atoms, $R_1$ is independently selected from the group consisting of hydrogen and alkyl of 1 to 5 carbon atoms, and n" is 0 to 10.

15. The polymer-encapsulated pigment according to claim 13, wherein the interface layer is selected from the group consisting of metal borates, metal borides, metal nitrides, metal carbides, metal sulfides, metalloid sulfides and polyhydroxyl polymeric materials.

16. The polymer-encapsulated pigment according to claim 13, wherein the pigment composition comprises at least one inorganic pigment.

17. The polymer-encapsulated pigment according to claim 13, wherein the pigment composition comprises at least one organic pigment.

18. The polymer-encapsulated pigment according to claim 13, wherein the interface layer has a chemical composition that is different from a chemical composition of the pigment composition.

19. The polymer-encapsulated pigment according to claim 13, wherein the interface layer has a thickness of about one to about ten nanometers.

20. An ink composition comprising an ink vehicle and the polymer-encapsulated pigment according to claim 1.

* * * * *

UNITED STATES PATENT AND TRADEMARK OFFICE
CERTIFICATE OF CORRECTION

PATENT NO. : 8,309,630 B2  
APPLICATION NO. : 12/693304  
DATED : November 13, 2012  
INVENTOR(S) : Doris Pik-Yiu Chun et al.

Page 1 of 1

It is certified that error appears in the above-identified patent and that said Letters Patent is hereby corrected as shown below:

In column 3, lines 22-23, delete "metal selenides, metalloid sulfides," and insert -- metalloid sulfides, metal selenides, --, therefor.

In column 17, lines 53-54, in Claim 1, delete "metal selenides, metalloid sulfides" and insert -- metalloid sulfides, metal selenides --, therefor.

Signed and Sealed this  
Second Day of April, 2013

Teresa Stanek Rea  
*Acting Director of the United States Patent and Trademark Office*